(12) United States Patent
Smeding

(10) Patent No.: US 9,649,876 B2
(45) Date of Patent: May 16, 2017

(54) WHEEL, AN ADAPTER, A KIT OF PARTS AND A METHOD

(75) Inventor: Derk Marcel Smeding, Rijperkerk (NL)

(73) Assignee: Xinix Wheel Technology B.V., Oud-Beijerland (NL)

( * ) Notice: Subject to any disclaimer, the term of this patent is extended or adjusted under 35 U.S.C. 154(b) by 581 days.

(21) Appl. No.: 13/996,970

(22) PCT Filed: Nov. 7, 2011

(86) PCT No.: PCT/NL2011/050759
§ 371 (c)(1),
(2), (4) Date: Aug. 27, 2013

(87) PCT Pub. No.: WO2012/087117
PCT Pub. Date: Jun. 28, 2012

(65) Prior Publication Data
US 2013/0328383 A1    Dec. 12, 2013

(30) Foreign Application Priority Data

Dec. 22, 2010   (EP) .................................... 10196660

(51) Int. Cl.
*B60B 19/00*   (2006.01)
*B60B 3/14*    (2006.01)
(Continued)

(52) U.S. Cl.
CPC ................ *B60B 3/147* (2013.01); *B60B 3/10* (2013.01); *B60B 3/16* (2013.01);
(Continued)

(58) Field of Classification Search
CPC B60B 3/14; B60B 3/147; B60B 3/008; B60B 3/16
See application file for complete search history.

(56) References Cited

U.S. PATENT DOCUMENTS 3,006,443 A * 10/1961 Siler .......................... E21D 7/00
                                                          285/148.27
3,329,468 A *  7/1967 Beith ......................... B60B 3/14
                                                            29/894.36
(Continued)

FOREIGN PATENT DOCUMENTS

CN       1181319 A    5/1998
CN     101711204 A    5/2010
(Continued)

OTHER PUBLICATIONS

Machine Translation of DE19526193 claims section, printed from EPO website on Jan. 7, 2017.*
(Continued)

*Primary Examiner* — J. Allen Shriver, II
*Assistant Examiner* — Travis Coolman
(74) *Attorney, Agent, or Firm* — Drinker Biddle & Reath LLP

(57) ABSTRACT

A wheel for a vehicle is disclosed. The wheel comprises a central portion attachable to a vehicle hub and a rim arranged radially outside the central portion for supporting a wheel tire. The central portion has a series of cavities configured to receive a corresponding adapter. A cavity of the series of cavities has a through hole. The through hole is aligned in an alignment direction for alignment with a through hole of a corresponding adapter for traversal by a mounting element to attach the central portion to the vehicle hub. The cavity is configured to receive the corresponding adapter in a unique rotational position with respect to the alignment direction. The cavity includes first and second cylindrically shaped and axially aligned volumes. The first volume is bounded by a first receiving wall portion that extends substantially parallel to a front side surface of the central portion. The second volume extends from the first volume towards a back side surface of the central portion.

(Continued)

The second volume is located radially within a radial outer periphery of the first volume.

20 Claims, 6 Drawing Sheets

(51) Int. Cl.
*B60B 3/16* (2006.01)
*B60B 3/10* (2006.01)

(52) U.S. Cl.
CPC ...... *B60B 2900/116* (2013.01); *B60Y 2200/11* (2013.01); *Y10T 29/49492* (2015.01)

(56) References Cited

U.S. PATENT DOCUMENTS

| | | | | |
|---|---|---|---|---|
| 3,428,365 A * | 2/1969 | Elby | ................. | B60B 3/14 |
| | | | | 301/35.631 |
| 3,749,450 A * | 7/1973 | Senter | ................. | B60B 3/14 |
| | | | | 301/35.631 |
| 3,759,576 A * | 9/1973 | Richter | ................. | B60B 3/14 |
| | | | | 301/35.629 |
| 3,779,610 A * | 12/1973 | Pansky | ................. | B60B 3/14 |
| | | | | 301/35.631 |
| 3,820,851 A * | 6/1974 | Longo | ................. | B60B 3/14 |
| | | | | 301/35.629 |
| 3,857,611 A * | 12/1974 | Pansky | ................. | B60B 3/14 |
| | | | | 301/35.54 |
| 3,869,174 A * | 3/1975 | Brown | ................. | B60B 3/14 |
| | | | | 301/35.629 |
| 3,988,038 A * | 10/1976 | Hedlund | ................. | B60B 3/14 |
| | | | | 301/35.629 |
| 4,036,530 A * | 7/1977 | Reppert | ................. | B60B 3/14 |
| | | | | 301/35.631 |
| 4,165,904 A * | 8/1979 | Reppert | ................. | B60B 3/14 |
| | | | | 301/35.629 |
| 5,362,134 A * | 11/1994 | Carmona | ................. | B60B 3/008 |
| | | | | 301/105.1 |
| 5,601,343 A * | 2/1997 | Hoffken | ................. | B60B 1/06 |
| | | | | 301/111.04 |
| 5,918,947 A | 7/1999 | Stach et al. | | |
| 5,992,063 A * | 11/1999 | Mack | ................. | E02F 9/2825 |
| | | | | 172/753 |
| 6,626,502 B1 * | 9/2003 | Petrak | ................. | B60B 3/147 |
| | | | | 301/35.629 |
| 6,966,722 B1 * | 11/2005 | Borror | ................. | F16B 5/025 |
| | | | | 403/243 |
| D542,354 S * | 5/2007 | Morrison | ................. | D20/22 |
| 7,614,707 B2 | 11/2009 | Jabbour, Jr. et al. | | |
| 2002/0130548 A1 * | 9/2002 | Gilley | ................. | B60B 3/147 |
| | | | | 301/35.631 |
| 2004/0222687 A1 * | 11/2004 | Kogure | ................. | G01M 1/30 |
| | | | | 301/35.631 |
| 2006/0103230 A1 * | 5/2006 | Wu | ................. | B60B 3/145 |
| | | | | 301/35.631 |
| 2012/0146395 A1 * | 6/2012 | Silva | ................. | B29C 45/0005 |
| | | | | 301/64.702 |
| 2013/0002006 A1 * | 1/2013 | Pruden | ................. | B60B 3/145 |
| | | | | 301/35.632 |

FOREIGN PATENT DOCUMENTS

| | | | | |
|---|---|---|---|---|
| DE | 3307055 A1 | 9/1984 | | |
| DE | 4225903 A1 * | 2/1994 | ............. | B60B 3/147 |
| DE | 19526193 A1 * | 1/1997 | ............. | B60B 3/145 |
| EP | 1241024 A1 | 9/2002 | | |
| EP | 2239151 A1 | 10/2010 | | |
| FR | 2569617 A1 | 3/1986 | | |
| WO | 02074555 A1 | 9/2002 | | |

OTHER PUBLICATIONS

Machine Translation of DE4225903 claims section, printed from EPO website on Jan. 7, 2017.*
Machine Translation of DE19526193 description section, printed from EPO website on Jan. 7, 2017.*
Machine Translation of DE4225903 description section, printed from EPO website on Jan. 7, 2017.*

* cited by examiner

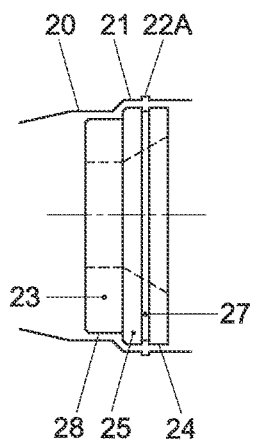 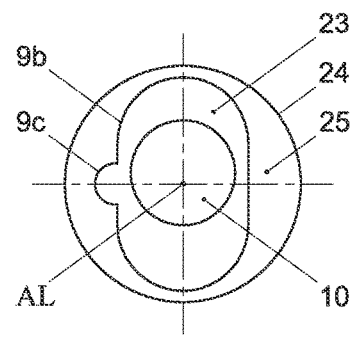 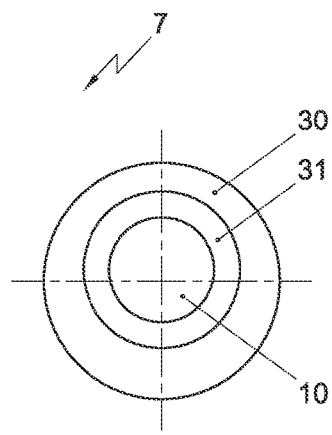
FIG. 3A  FIG. 3B  FIG. 3C
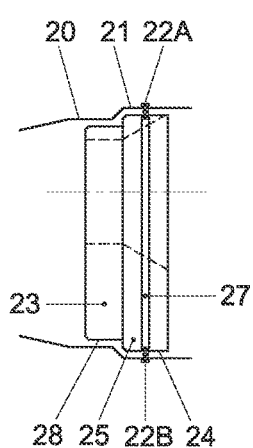 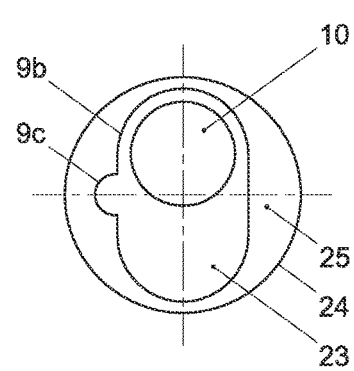 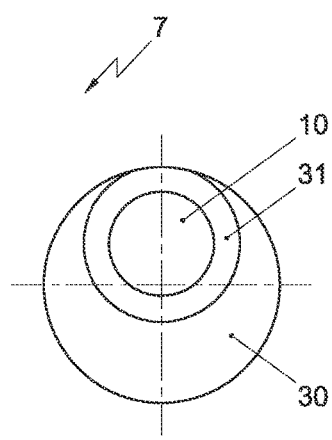
FIG. 4A  FIG. 4B  FIG. 4C

WHEEL, AN ADAPTER, A KIT OF PARTS AND A METHOD

BACKGROUND

The disclosure herein relates to a wheel for a vehicle, the wheel configured to support a wheel tire. The wheel includes a central portion attachable to a vehicle hub and a rim arranged radially outside the central portion. The central portion has a series of cavities configured to receive a corresponding adapter. A cavity of the series of cavities has a through hole, the through hole being aligned in an alignment direction with a through hole of a corresponding adapter. The through hole of the cavity and the through hole of the corresponding adapter are configured to receive a mounting element that mounts the central portion to the vehicle hub.

International patent publication WO 02/074555 discloses one example of a wheel mounted to a vehicle hub by inserting a bolt through a through hole of an adapter and an aligned through hole of a cavity of the wheel into a screw aperture in the vehicle hub. The through hole in the adapter is placed eccentrically. Further, the adapter may rotate in the cavity, so that a distance between the adapter through hole and the wheel central axis, also called the pitch circle diameter, can be set. The wheel thus can be used for mounting to a variety of vehicle hubs having different pitch circle diameters.

Although a wheel as described above enables adjusting the distance between the through hole in the adapter with respect to the central wheel axis, a number of disadvantages may be identified. The step of adjusting said distance complicates a process of mounting the wheel to a vehicle hub, making it generally too complex for an inexperienced person to perform the steps necessary for properly mounting the wheel. Further, an experienced person has to perform multiple steps to mount the wheel, thereby introducing a chance of making errors, e.g. in aligning the through holes of the adapter and the cavity properly, and increasing a time period for the overall mounting process. Also, during the mounting process or during transport of storage of the wheel, the rotatable adapter can be lost. In addition, a process of balancing the wheel may not be accurate.

BRIEF DESCRIPTION OF THE DRAWINGS

These and/or other embodiments will become apparent and more readily appreciated from the following description of the embodiments, taken in conjunction with the accompanying drawings of which:

FIGS. 3A, 3B, and 3C show schematic views of a first embodiment of an adapter;

FIGS. 4A, 4B, and 4C show schematic views of a second embodiment of an adapter;

DETAILED DESCRIPTION

It is noted that the figures show merely various embodiments according to the invention. In the figures, the same reference numbers refer to equal or corresponding parts.

An embodiment of the invention includes a wheel where at least one of the above-mentioned disadvantages is reduced. In particular, an embodiment of the invention provides a wheel where a mounting process is simplified. According to an embodiment, the cavity is configured to receive the corresponding adapter in a unique rotational position with respect to the alignment direction. The cavity includes first and second cylindrically shaped and axially aligned volumes. The first volume is bounded by a first receiving wall portion that extends substantially parallel to the front side surface of the central portion. The second volume extends from the first volume towards a back side surface of the central portion. The second volume is located radially within a radial outer periphery of the first volume.

By providing a cavity configured to receive the adapter in a unique rotation position, the adapter may be moved into the cavity in a single angular position only, so that the mounting process is simplified. Also an inexperienced person may mount the wheel to the vehicle hub. In addition, due to the simplified step of inserting the adapters, the process of mounting the wheel may be performed more quickly.

Further, an adapter having a two-body configuration (e.g., first and second body portions) such that the back side and the front side of a first body portion are parallel, allows for a force, exerted by a bolt, to the adapter to be transferred in a robust manner to the wheel. An adapter solution is provided that can be applied to an existing wheel design. The parallel surface configuration of the first body portion also enables designing the axial dimensions of the adapter/bolt assembly such that the bolt does not protrude beyond the front side surface of the wheel central portion. Various embodiments of the invention allow the pitch circle diameter of the wheel to be set by selection of the adapter type. For example, the pitch circle diameter may be changed by selecting another adapter having a through hole that is located at another location in the adapter.

An embodiment of the invention includes an adapter.

Another embodiment of the invention includes a kit of parts.

Yet another embodiment of the invention includes a method.

Figure 1:
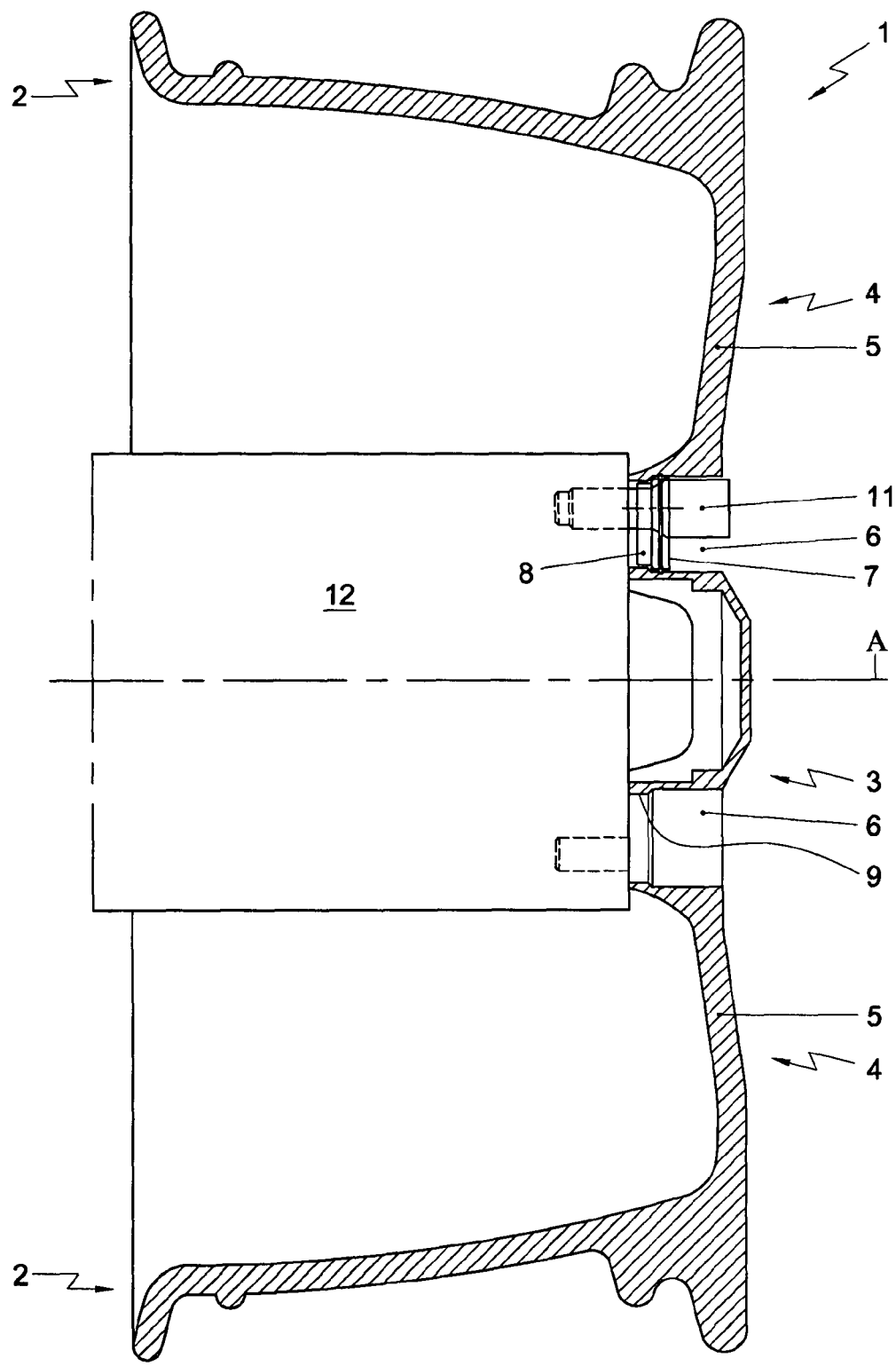
FIG. 1 shows a schematic cross section view of a wheel according to the invention.

FIG. 1 shows a schematic cross section view of a wheel 1 according to an embodiment. The wheel 1 comprises a central portion 3 and a rim 2. The central portion 3 is attachable to a vehicle hub 12 having a central axis A. Further, the rim 2 is arranged radially outside the central portion 3 for supporting a wheel tire (not shown).

The wheel 1 also includes an intermediate portion 4 interconnecting the rim 2 to the central portion 3. The intermediate portion 4 may be formed by a plurality of spokes 5, as shown in FIG. 1. Alternatively, the intermediate portion 4 is formed by a ring shaped segment. Further, the central portion 3 may be directly connected to the rim 2.

Figure 2A:
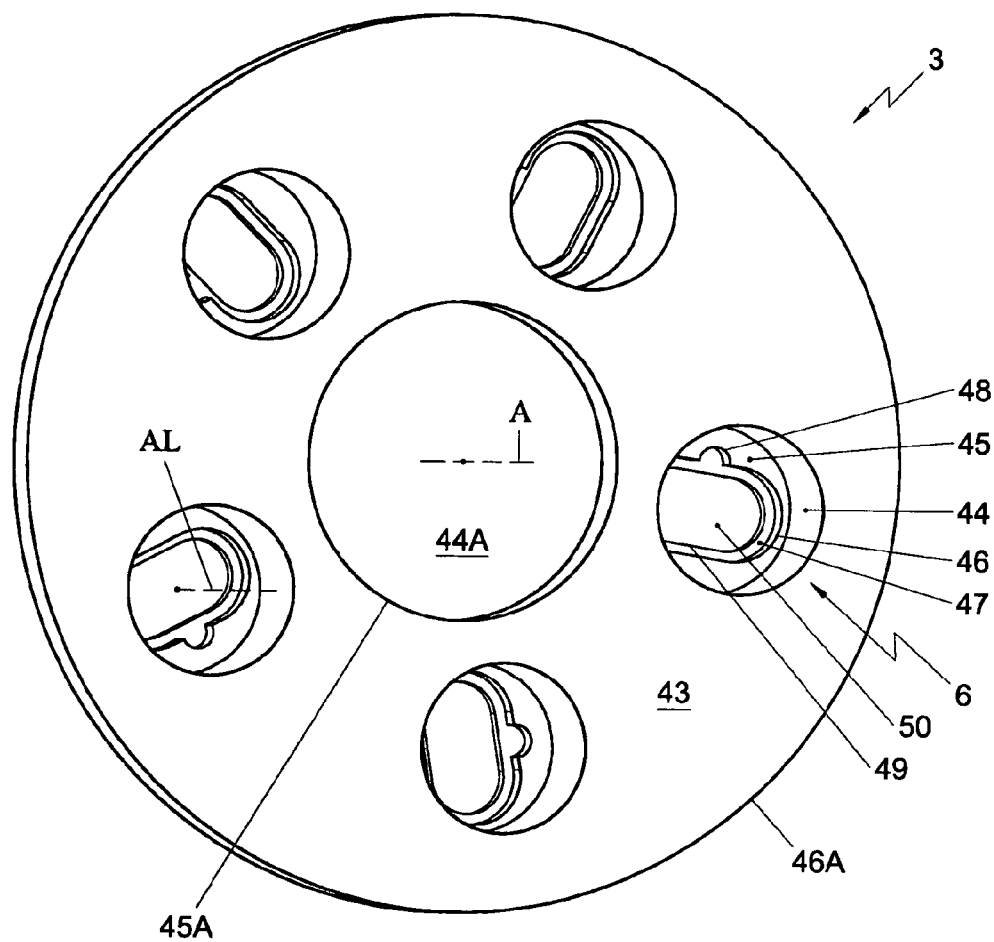
FIG. 2A shows a schematic perspective front view of a central portion of a wheel shown in FIG. 1.
Figure 2B:
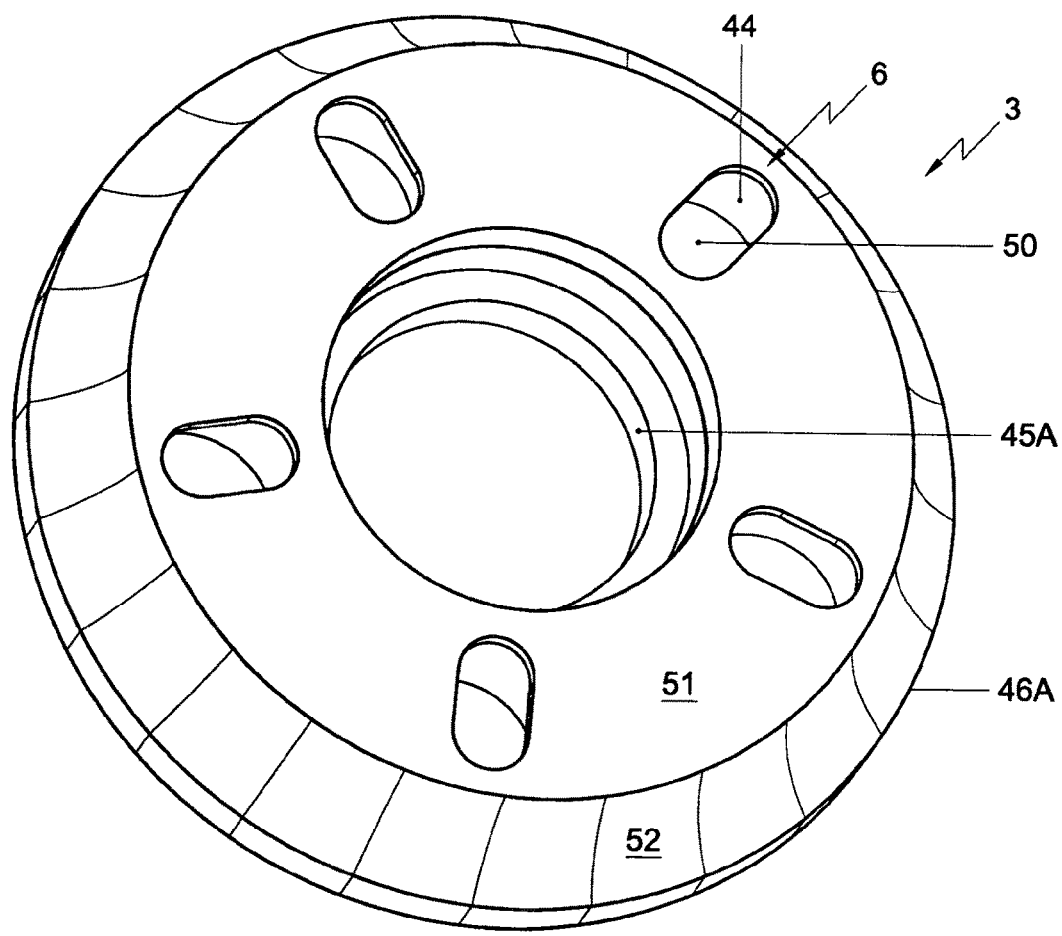
FIG. 2B shows a schematic perspective back view of a central portion of a wheel shown in FIG. 1.

FIGS. 2A and 2B show schematic perspective front and back views, respectively, of the central portion 3 of the wheel 1 shown in FIG. 1. The central portion 3 is provided with a series of cavities 6 for receiving a corresponding adapter (not shown in FIG. 2A). In the shown embodiment, the cavities are arranged at a fixed radial distance with respect to the central axis A and distributed in a circumferential direction. Each cavity 6 has a cavity through hole 50 that is aligned in an alignment direction AL parallel to the central axis A.

FIGS. 3A, 3B, and 3C show schematic side, rear, and front views, respectively, of a first embodiment of an adapter 7. The adapter 7 includes an adapter through hole 10 that is aligned with the cavity through hole 50 when the adapter 7 is received in the cavity 6. The cavity 6 is configured to receive the corresponding adapter 7 in a unique rotational position with respect to the alignment direction AL. In a mounted state of the wheel 1, a mounting element 11 (e.g., a bolt) traverses the adapter through hole 10 and the cavity through hole 50 to attach the wheel 1 to the vehicle hub 12.

The central portion 3 is generally formed as a ring having an inner rim 45A surrounding a central aperture 44A and having an outer rim 46A. In an alternative embodiment, the central portion 3 has another shape, e.g. a disc. Further, the outer rim 46A can be formed otherwise, e.g. as a polygon. In the embodiment shown, the central portion 3 has a generally flat structure having a front side surface 43 and a back side surface 51. The outer rim 46A may include a beveled surface 52 at the back side. The central portion 3 may include curved portions, e.g. a portion at least partially surrounding the vehicle hub. Also, the alignment direction AL of the cavity through hole 50 and the adapter through hole 10 may intersect the central axis A. As an example, the alignment direction AL may be transverse with respect to the central axis, such that the mounting element 11 traversing the through holes 10, 50 engages the vehicle hub 12 in a radial direction, transverse to the central axis A.

The cavity 6 includes a first volume and a second volume. The first volume is generally shaped as a cylinder and may have a constant cross section. For example, the first volume may be shaped as a disc. In the shown embodiment, the first volume is radially surrounded by first radial wall portion 21, 44, forming a circular contour. The first volume is axially bounded by a first receiving wall portion 45 configured to receive the adapter 7. The first receiving wall portion 45 extends mainly parallel to the front side surface 43 of the central portion 3. The second volume is also generally shaped as a cylinder and may have a constant cross section. The second volume extends from the first volume in the alignment direction AL, towards the back side surface 51. The second volume is radially surrounded by a second radial wall portion 46 forming a rotationally asymmetric contour. The second radial wall portion 46 includes a radially outwardly extending portion 48. Further, the second volume is axially bounded by a second receiving wall portion 47 forming a recess in the first receiving wall portion 45. In the second receiving wall portion 47 of the cavity 6, the through hole 50 is formed being radially surrounded by a hole wall 49.

It is noted that, as an alternative, the second radial wall portion 46 may include a radially inwardly extending portion instead of the radially outwardly extending portion 48. In a further example, the second radial wall portion 46 may include a plurality of radially inwardly or outwardly extending portions.

Figure 5:
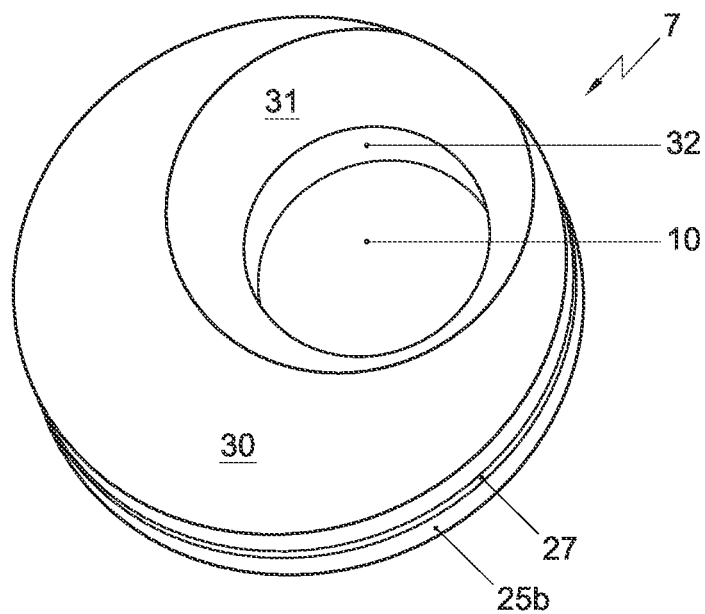
FIG. 5 shows a schematic perspective front view of the adapter shown in FIGS. 4A, 4B, and 4C.
Figure 6:
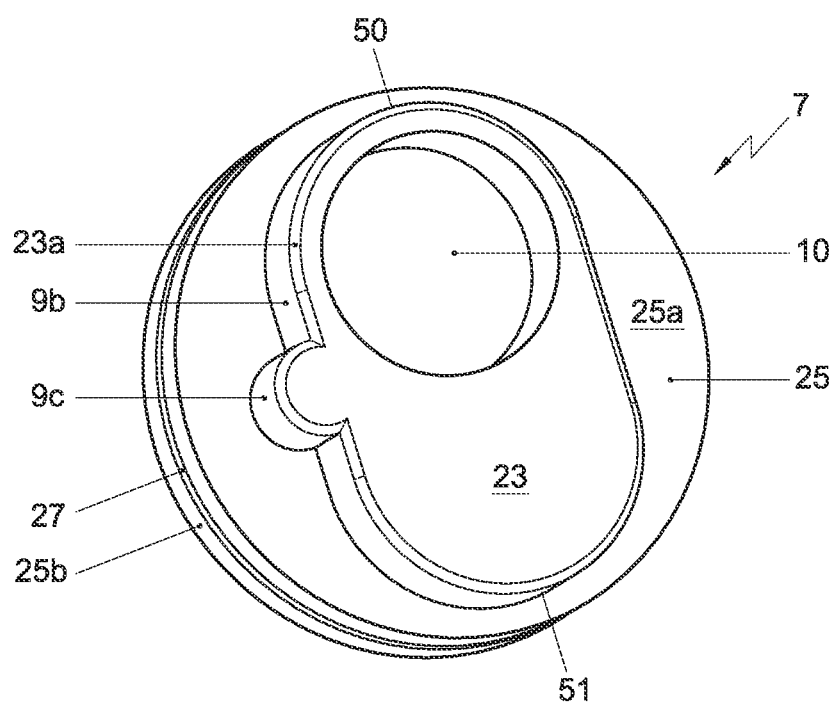
FIG. 6 shows a schematic perspective back view of the adapter shown in FIGS. 4A, 4B, and 4C.

FIGS. 4A, 4B, and 4C show schematic side, rear, and front views, respectively, of a second embodiment of an adapter 7. Further, FIGS. 5 and 6 show a schematic perspective front view and back view, respectively, of the adapter 7 shown in FIG. 3B.

The adapter 7 in the first and second embodiment includes first and second body portions, both shaped as a cylinder, and substantially matching the first and second volumes of the cavity 6. The first body portion 25 may be shaped as a disc while the second body portion 23 has a rotationally asymmetric contour 9b, 28 substantially matching the contour of the second radial wall portion 20, 46. Similarly, a contour of the second body portion 23 may include a radially outwardly extending portion 9c. The first and the second body portions have each a substantially constant cross section and are preferably integrally formed. Further, the second body portion 23 extends axially from the first body portion 25 and is axially aligned therewith. The first body portion 25 has a front surface 30 and a back surface 25a extending toward the radial outer periphery 25b of the first body portion 25. The front surface 30 and the back surface 25a are mainly parallel. Further, the second body portion 23 is located radially within the periphery 25b of the disc 25. The adapter 7 further includes a through hole 10 formed inside the first and second body portion 23, 25. The alignment direction AL of the adapter through hole 10 is parallel with the longitudinal axis of the first and second cylinder. The through hole 10 is surrounded by an adapter inner wall 32. At the front side of the first body 25, the front surface 30 includes a beveled section 31 for receiving a head portion of the mounting element 11 extending through the through holes 10, 50.

By arranging an adapter 7 having a two-body configuration (e.g., first and second body portions) such that the back side 25a and the front side 30 of the first body portion 25 are parallel, the force that is exerted by a bolt (e.g., mounting element 11) to the adapter may be transferred in a robust manner to the wheel.

By matching geometry of the cavity 6 to geometry of the corresponding adapter 7, the adapter 7 may be fixed in a unique rotation position with respect to the alignment direction AL. A wall segment of the cavity, e.g. the second radial wall portion 46, is configured to block the received adapter 7 against rotational movement. In this example, the adapter 7 fits only in the cavity when rotated over a single or a multiple times of 360°. In an axial view, the second radial wall portion 46 in one example encloses a substantially elongated area, such as a rectangle having rounded corners, or an ellipse. In a further example, the wall segment may enclose an irregular formed area.

When the adapter 7 is received in the corresponding cavity 6, the first and second adapter body portions 25 and 23 abut against the first receiving wall portion 45 and the second receiving wall portion 47, respectively.

The dimensions of the cavity through hole 50 may be larger than the dimensions of the adapter through hole 10. Therefore, the position of the adapter through hole 10 may vary while the mounting element 11 may still traverse both through holes 10, 50.

FIGS. 3A, 3B, and 3C show a cross sectional side view of an adapter 7 being received in the cavity, a back view of the adapter 7, and a front view of the adapter 7, respectively, according to an embodiment. FIGS. 4A, 4B, and 4C show a cross sectional side view of an adapter 7 being received in the cavity, a back view of the adapter 7, and a front view of the adapter 7, respectively, according to another embodiment. In the shown embodiments, the radial outer periphery 9b of the second body portion 23 has a generally elongated shape with rounded ends 50, 51. Here, the radial outer periphery 9b of the second body portion 23 includes a radially outwardly extending portion 9c provided on a bi-symmetric elongated shape contour 9b. By supplementing the bi-symmetric contour 9b with a radially outwardly or inwardly extending portion 9c, a rotationally asymmetric contour is obtained, so that the adapter 7 fits in the cavity 6 of the wheel 1 in only one unique rotational position.

Figure 7:
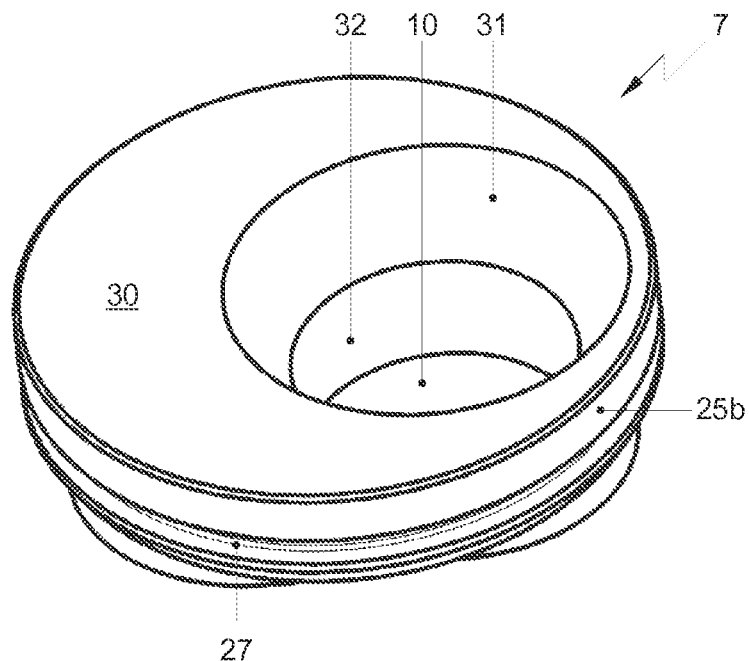
FIG. 7 shows a schematic perspective front view of a further adapter according to another embodiment.
Figure 8:
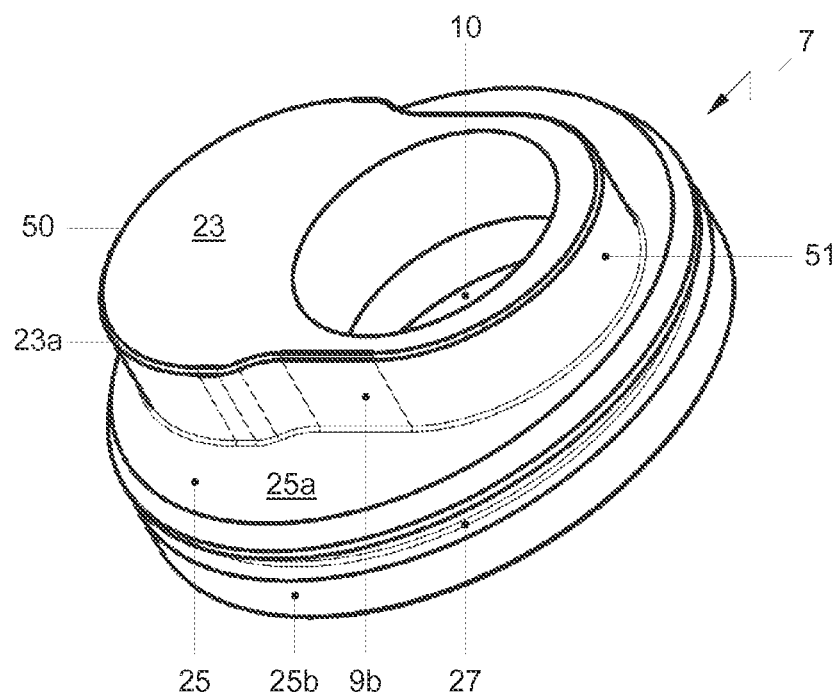
FIG. 8 shows a schematic perspective back view of the adapter shown in FIG. 7.

FIGS. 7 and 8 show schematic perspective views of another embodiment of the adapter 7, from the front and the back side, respectively. In the embodiment shown in FIGS. 7 and 8, the radial outer periphery 9b of the second body portion has a generally elongated shape with rounded ends. A radius of curvature at a first rounded end 50 is different from the radius of curvature at a second rounded end 51. Therefore, the first end 50 has the shape of a semi-circle having a first radius curvature, while the second end 51 has the shape of a semi-circle having a second radius curvature.

According to another embodiment, a plurality of adapters 7 are provided having different through hole positions forming a kit of parts. In the embodiment shown in FIGS. 3A, 3B, and 3C, the through hole 10 is located near a center of the adapter 7, while in the embodiment shown in FIGS. 4A, 4B, and 4C, the through hole 10 is located in a more eccentric position, in a longitudinal direction of the second body portion 23. By selecting an adapter 7 having the through hole 10 at a specific location, a distance between the through hole 10 and the central axis A (e.g., a pitch circle diameter) may be set.

As an example, in case of a vehicle hub 12 having a diameter of 143 mm, a pitch circle diameter can be set at 98, 100, 105, 108, 110, 112, 114.3, 118 or 120 mm. Similarly, in case of a vehicle hub having a diameter of 152 mm, a pitch circle diameter can be set at 118, 120, 127 or 130 mm. Further, appropriate bolt diameters can be selected, e.g. in a range of 20-23 mm.

In this context it is noted that a central pitch circle of the adapter 7 can be appropriately chosen to enable standard pitch circles. As an example, the central pitch circle of the adapter 7 can be chosen as 104 or 109 mm.

Such a kit of parts may include two, three, four, five or more adapters 7 having different through hole positions and forming a set of adapters 7. The kit may include a plurality of sets of adapters 7, the plurality corresponding to the number of cavities 6 in the wheel 1. Further, the kit may include a number (e.g., four) of the plurality of sets of adapters 7, so that four wheels 1 can be prepared for mounting to a vehicle. In the example of five cavities 6 in the wheel 1, twenty sets of adapters 7 are needed for mounting the wheels 1. Further, the set of adapters 7 may include a single adapter 7, so that for each cavity 6 one adapter 7 is available in the kit of adapters 7. Also, at least one spare adapter 7 may be included in the kit of parts. The kit of parts may include a wheel 1 and a set of adapters 7 that can be received in the cavities 6 of the wheel 1.

According to an embodiment, adapters 7 having the through hole 6 at an identical location can be provided with means for recognizing them as such, e.g. by providing them with an identification color.

A radial outer periphery 24 of the first body portion 25 may include a groove 27 that extends in a circumferential direction. The groove 27 may be configured to receive a locking ring 22B for locking the adapter 7 in the alignment direction AL. Accordingly, the first radial wall portion 44, 21 of the cavity 6 may include a corresponding groove 22A, as shown in FIGS. 3A and 4A. By axially locking the adapter 7 to the wheel 1, it is less likely that the adapter 7 is unintentionally separated from the wheel 1. Further, since the adapter 7 is fixed locked to the wheel 1, a wheel balancing process may be performed accurately. The locking ring 22B may be released by pressing the adapter 7 outwardly from the cavity 6, thereby enabling re-use of the wheel.

At least one edge between a radial wall portion and a receiving wall portion of the adapter 7 may be beveled to enhance transfer of contact forces between the adapter 7 and the central portion 3. Accordingly, such a beveled edge corresponds to a beveled edge of the adapter 7. As an example, FIG. 6 shows a beveled surface 23A arranged between an end face of the second body portion 23 and a side contour 9b radially surrounding the second body portion 23.

Further, the first radial wall portion 44 and the second radial wall portion 46 may be tapered to facilitate a step of inserting the adapter 7 in the corresponding cavity 6.

Another embodiment includes a method for preparing a wheel for attachment to a vehicle hub. A wheel for a vehicle is provided, the wheel including a central portion attachable to a vehicle hub and a rim arranged radially outside the central portion for supporting a wheel tire. The central portion has a series of cavities configured to receive a corresponding adapter. A cavity of the series of cavities has a through hole having an alignment direction. An adapter is provided, the adapter having a through hole. The adapter is configured to be received in a corresponding cavity in a unique rotational position with respect to the alignment direction. The adapter is moved into the corresponding cavity along the alignment direction.

It will be understood that the above described embodiments of the invention are exemplary only and that other embodiments are possible without departing from the scope of the invention. It will be understood that many variants are possible.

As an example, the through hole 50 of the cavity 6 may be provided with a same contour as the second radial wall portion 9 surrounding the second body portion 23 of the adapter 7. In a further example, the adapter 7 may be provided with a single cylindrical body portion having a rotationally asymmetric contour so that the adapter 7 is received in a unique rotation position with respect to the alignment direction.

The adapter 7 may be made from any metal or plastic, e.g. from so called "automaten" steel and may be electrolytically galvanized to counteract corrosion.

Such variants will be apparent to the person skilled in the art and are considered to fall within the scope of the invention as defined in the following claims.

Various embodiments of the invention are described in the following claims.

All references, including publications, patent applications, and patents, cited herein are hereby incorporated by reference to the same extent as if each reference were individually and specifically indicated to be incorporated by reference and were set forth in its entirety herein.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

The invention claimed is:

1. An apparatus, comprising:
an adapter configured to be removably received in a cavity of a series of cavities of a central portion of a vehicle wheel,
wherein the adapter has a through hole for alignment, in an alignment direction, with a through hole of a corresponding cavity, of the series of cavities, for traversal by a mounting element to attach the central portion to a vehicle hub,
wherein the adapter is configured to be removably received in the corresponding cavity in a single, solitary and unique rotational position with respect to the alignment direction,
wherein the adapter includes first and second cylindrically shaped and axially aligned body portions,
wherein the first body portion includes a front surface and a back surface, wherein the back surface is substantially parallel to the front surface and extends towards a radial outer periphery of the first body portion, and
wherein the second body portion is located radially within the radial outer periphery of the first body portion.

2. An adapter according to claim 1, wherein the first body portion is shaped as a disc.

3. The adapter according to claim 2, wherein the second body portion has a rotationally asymmetric contour.

4. The adapter according to claim 3, wherein a radial outer periphery of the second body portion has a generally elongated shape with rounded ends.

5. The adapter according to claim 4, wherein a radius of curvature at a first rounded end of the second body portion is different from a radius of curvature at a second rounded end of the second body portion.

6. An adapter according to claim 1, wherein a radial outer periphery of the second body portion has a generally elongated shape with rounded ends.

7. An adapter according to claim 6, wherein a radius of curvature at a first rounded end of the second body portion is different from a radius of curvature at a second rounded end of the second body portion.

8. An adapter according to claim 6, wherein the radial outer periphery of the second body portion includes a radially inwardly or radially outwardly extending portion with a bi-symmetric elongated shape contour.

9. An adapter according to claim 1, wherein the second body portion has a rotationally asymmetric contour.

10. An adapter according to claim 1, further comprising
a groove that extends circumferentially in the radial outer periphery of the first body portion, and
a locking ring received in the groove.

11. A wheel for a vehicle, the wheel comprising:
a central portion attachable to a vehicle hub, and
a rim arranged radially outside the central portion for supporting a wheel tire,
wherein the central portion has a series of cavities, each cavity of the series of cavities being configured to receive a corresponding adapter of a series of adapters,
wherein each cavity of the series of cavities has a through hole, wherein the through hole is aligned in an alignment direction with a through hole of a corresponding adapter for traversal by a mounting element to attach the central portion to the vehicle hub,
wherein each cavity of the series of cavities is configured to removably receive the corresponding adapter in a single, solitary and unique rotational position with respect to the alignment direction,
wherein each cavity of the series of cavities includes first and second cylindrically shaped and axially aligned volumes,
wherein the first volume is bounded by a first receiving wall portion that extends substantially parallel to a front side surface of the central portion,
wherein the second volume extends from the first volume towards a back side surface of the central portion, and
wherein the second volume is located radially within a radial outer periphery of the first volume.

12. The wheel according to claim 11, wherein the central portion comprises a first radial wall portion that radially surrounds the first volume,
wherein the central portion comprises a second radial wall portion that radially surrounds the second volume.

13. The wheel according to claim 12, wherein the first radial wall portion has a circular contour,
wherein the second radial wall portion encloses a substantially elongated area.

14. A wheel according to claim 11, wherein a wall of the cavity includes a wall segment configured to block the corresponding adapter against rotational movement.

15. A wheel according to claim 11, wherein a wall of the cavity includes a wall segment with a rotationally asymmetric contour.

16. A wheel according to claim 11, wherein a wall of the cavity includes a wall segment that encloses a substantially elongated area.

17. A wheel according to claim 11, wherein dimensions of the through hole of the cavity are larger than dimensions of the through hole of the adapter.

18. A wheel according to claim 11, wherein an adapter is received in a corresponding cavity.

19. A kit of parts, the kit comprising:
a plurality of adapters configured to be removably received in corresponding cavities, of a series of cavities, provided in a central portion of a vehicle wheel,
wherein the adapters have respective through holes for alignment in an alignment direction of through holes in the corresponding cavities, for traversal by a mounting element that mounts the central portion to a vehicle hub,
wherein the adapters are configured to be removably received in the corresponding cavities in a single, solitary and unique rotational position with respect to the alignment direction,
wherein an adapter, of the plurality of adapters, includes first and second cylindrically shaped and axially aligned body portions,
wherein the first body portion includes a front surface and a back surface, wherein the back surface is substantially parallel to the front surface and extends towards a radial outer periphery of the first body portion, and
wherein the second body portion is located radially within the radial outer periphery of the first body portion.

20. A method for preparing a wheel for attachment to a vehicle hub, the method comprising:
providing a wheel for a vehicle, the wheel including a central portion attachable to a vehicle hub and a rim arranged radially outside the central portion for supporting a wheel tire, wherein the central portion has a series of cavities configured to removably receive a corresponding adapter, wherein a cavity of the series of cavities has a through hole having an alignment direction;
providing an adapter having a through hole, wherein the adapter is configured to be removably received in a corresponding cavity, of the series of cavities, in a single, solitary and unique rotational position with respect to the alignment direction, wherein the adapter includes first and second cylindrically shaped and axially aligned body portions, wherein the first body portion includes a front surface and a back surface, wherein the back surface is substantially parallel to the front surface and extends towards a radial outer periphery of the first body portion, and wherein the second body portion is located radially within the radial outer periphery of the first body portion, and
moving the adapter into the corresponding cavity along the alignment direction.

* * * * *